United States Patent
Brabender et al.

(10) Patent No.: US 10,649,895 B2
(45) Date of Patent: May 12, 2020

(54) COMMON MCU SELF-IDENTIFICATION INFORMATION

(71) Applicant: RENESAS ELECTRONICS AMERICA INC., Milpitas, CA (US)

(72) Inventors: Jon Matthew Brabender, Cary, NC (US); Bernd Willi Westhoff, Dusseldorf (DE)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/240,473

(22) Filed: Jan. 4, 2019

(65) Prior Publication Data

US 2019/0138444 A1    May 9, 2019

Related U.S. Application Data

(63) Continuation of application No. 14/755,101, filed on Jun. 30, 2015, now Pat. No. 10,176,094.

(51) Int. Cl.
| | |
|---|---|
| *G06F 12/00* | (2006.01) |
| *G06F 13/00* | (2006.01) |
| *G06F 12/06* | (2006.01) |
| *G06F 9/4401* | (2018.01) |

(52) U.S. Cl.
CPC ........... *G06F 12/06* (2013.01); *G06F 13/00* (2013.01); *G06F 9/4403* (2013.01)

(58) Field of Classification Search
CPC .................................. G06F 12/06; G06F 13/00
See application file for complete search history.

(56) References Cited

U.S. PATENT DOCUMENTS

| | | | |
|---|---|---|---|
| 5,579,509 A | 11/1996 | Furtney et al. | |
| 5,613,119 A | 3/1997 | France et al. | |
| 6,308,317 B1 | 10/2001 | Wilkinson et al. | |
| 6,816,963 B1 | 11/2004 | Krithivas et al. | |
| 6,907,522 B2* | 6/2005 | Morais | G06F 21/575 711/102 |
| 7,086,014 B1 | 8/2006 | Bartz et al. | |
| RE40,188 E | 3/2008 | Lofstrom | |
| 7,406,674 B1 | 7/2008 | Ogami et al. | |
| 7,653,444 B2* | 1/2010 | Tabata | H04N 1/00928 380/277 |

(Continued)

OTHER PUBLICATIONS

Brabender, Jon Matthew et al., "Data Driven Embedded Application Building and Configuration," U.S. Appl. No. 15/290,773, filed Oct. 11, 2016; 39 pages consisting of Specification, Claims, Abstract, and Drawings.

(Continued)

*Primary Examiner* — Sean D Rossiter
(74) *Attorney, Agent, or Firm* — Foley & Lardner LLP

(57) ABSTRACT

Common microcontroller unit (MCU) self-identification information is disclosed. In one embodiment, an MCU is contained in a package. The MCU includes a central processing unit (CPU) and a non-volatile memory. This non-volatile memory stores information specific to the MCU and/or the package. The non-volatile memory also stores a common main program that, when executed by the CPU, accesses the information. The information enables the common main program to adapt itself to resources of the MCU and/or package that are identified in the information.

19 Claims, 3 Drawing Sheets

(56) References Cited

U.S. PATENT DOCUMENTS

| | | | |
|---|---|---|---|
| 7,873,948 B2 | 1/2011 | Sentovich et al. | |
| 8,045,093 B2 | 10/2011 | Won et al. | |
| 8,117,587 B1 | 2/2012 | Testardi | |
| 8,387,005 B1 | 2/2013 | Ghosh-Roy et al. | |
| 8,983,823 B1 | 3/2015 | Koh et al. | |
| 9,152,541 B1 | 10/2015 | Kuo et al. | |
| 2003/0200350 A1 | 10/2003 | Kumar et al. | |
| 2005/0177816 A1 | 8/2005 | Kudukoli et al. | |
| 2005/0183045 A1 | 8/2005 | Hwang et al. | |
| 2005/0210179 A1* | 9/2005 | Walmsley | B41J 2/04505 711/3 |
| 2006/0010446 A1 | 1/2006 | Desai et al. | |
| 2006/0020910 A1 | 1/2006 | Schlanger et al. | |
| 2006/0033945 A1 | 2/2006 | McDonald et al. | |
| 2007/0010980 A1* | 1/2007 | Tabata | H04N 1/00928 703/13 |
| 2007/0055854 A1 | 3/2007 | Chang et al. | |
| 2007/0056780 A1 | 3/2007 | Jaenke et al. | |
| 2007/0130530 A1 | 6/2007 | Anderson et al. | |
| 2008/0077750 A1* | 3/2008 | Panda | G06F 13/1668 711/154 |
| 2008/0079148 A1* | 4/2008 | Leung | G06F 1/22 257/734 |
| 2008/0126754 A1* | 5/2008 | Chang | G06F 9/3802 712/205 |
| 2010/0011198 A1 | 1/2010 | Hooker et al. | |
| 2010/0234071 A1 | 9/2010 | Shabtay et al. | |
| 2010/0293080 A1 | 11/2010 | Shah | |
| 2010/0306590 A1 | 12/2010 | Anand et al. | |
| 2011/0004719 A1 | 1/2011 | Fitzgerald | |
| 2012/0173931 A1 | 7/2012 | Kube et al. | |
| 2012/0269185 A1 | 10/2012 | Castleman et al. | |
| 2012/0303216 A1 | 11/2012 | Yoshimura et al. | |
| 2012/0324408 A1 | 12/2012 | Shacham et al. | |
| 2013/0125107 A1 | 5/2013 | Bandakka et al. | |
| 2014/0280961 A1 | 9/2014 | Martinez et al. | |
| 2014/0304439 A1* | 10/2014 | Elahi | G06F 13/24 710/51 |
| 2014/0359558 A1 | 12/2014 | Chamberlain | |
| 2015/0066823 A1 | 3/2015 | Rubin et al. | |
| 2015/0074259 A1 | 3/2015 | Ansari et al. | |
| 2015/0234481 A1 | 8/2015 | Nasiri et al. | |
| 2016/0098562 A1 | 4/2016 | Hawblitzel et al. | |
| 2016/0380817 A1 | 12/2016 | Agarwal et al. | |
| 2017/0003910 A1 | 1/2017 | Brabender et al. | |
| 2017/0060541 A1 | 3/2017 | Saleh et al. | |
| 2017/0102924 A1 | 4/2017 | Hussey et al. | |
| 2017/0102955 A1 | 4/2017 | Hussey et al. | |
| 2017/0103192 A1 | 4/2017 | Hussey et al. | |
| 2017/0116966 A1 | 4/2017 | Brabender | |
| 2017/0131977 A1 | 5/2017 | Brabender et al. | |
| 2017/0346333 A1 | 11/2017 | De La Cropte De Chanterac et al. | |
| 2019/0163449 A1 | 5/2019 | Hein et al. | |

OTHER PUBLICATIONS

Broman, Karl, "Connecting to other packages," 2014, pp. 1-3, downloaded from the Wayback Machine Internet Archive on Sep. 29, 2017 from <url>:https://web.archive.org/web/20141010124855/http://kbroman.org/pkg_primer/pages/depends.html.

Hebert, Olivier et al., "A method to Derive Application-Specific Embedded Processing Cores," 2000, Proceedings of the Eighth International Workshop on Hardware/Software Codesign, pp. 88-92, downloaded on Sep. 30, 2017 from the Internet at <url>:http://ieeexplore.ieee.org/document/843713/.

Hussey, Brandon Cranford et al., "Software Architecture for Embedded Systems," U.S. Appl. No. 15/290,491, filed Oct. 11, 2016; 36 pages consisting of Specification, Claims, Abstract, and Drawings.

M. Sgroi et al., "Formal models for embedded system design," 2000 [retrieved on May 24, 2019], IEEE Design & Test of Computers vol. 17, Issue 2, pp. 14-27. (Year: 2000).

S. Edwards et al., "Design of embedded systems: formal models, validation, and synthesis," 1997 [retrieved on May 24, 2019], Proceedings of the IEEE, vol. 85, Issue 3, pp. 366-390, downloaded from :https://ieeexplore.ieee.org. (Year: 1997).

Y. Zhang et al., "A software/hardware co-design methodology for embedded microprocessor core design," 1999 [retrieved on May 24, 2019], IEEE Transactions on Consumer Electronics, vol. 45, Issue 4, p. 1241-1246, downloaded from :https://ieeexplore.ieee.org. (Year: 1999).

A. Voulgaris et al., "An intelligent microcontroller-based configuration for sensor validation and error compensation," 2003 [retrieved on Jun. 17, 2019], Proceedings of the 20th IEEE Instrumentation Technology Conference, pp. 973-976, downloaded from <url>:https://ieeexplore.ieee.org. (Year: 2003).

Ashish Chauhan et al., "Reconfiguration of FPGA for Domain Specific Applications Using Embedded System Approach," 2009 [retrieved on Jun. 17, 2019], International Conference on Signal Processing Systems, pp. 438-442, downloaded from <url>:https://ieeexplore.ieee.org. (Year: 2009).

Bastian Schlich et al., "[mc]square: A Model Checker for Microcontroller Code," 2006 [retrieved on Jun. 17, 2019], Second International Symposium on Leveraging Applications of Formal Methods, Verification and Validation (isola 2006), pp. 466-473, downloaded from <url>:https://ieeexplore.ieee.org. (Year: 2006).

* cited by examiner

COMMON MCU SELF-IDENTIFICATION INFORMATION

CROSS-REFERENCE TO RELATED APPLICATIONS

The present application is continuation of U.S. patent application Ser. No. 14/755,101 filed Jun. 30, 2015, the contents of which are incorporated herein by reference in their entirety.

BACKGROUND

Microcontroller units (MCUs) are small computers formed on integrated circuits. MCUs provide embedded control of a wide range of devices, such as office machines, appliances, automobile engine control systems, implantable medical devices, power tools, toys, etc.

MCUs include a central processing unit (CPU) and memory. The memory can be divided into program memory, which typically takes form in flash memory, and data memory, which typically takes form in random access memory (RAM). Data memory contains special function registers and general purpose registers that store data used by the CPU. Program memory stores a reset program and a main program. The reset program is executed by the CPU when the MCU is first started or otherwise reset. The CPU then executes the main program. Separate address spaces may exist for the program memory and the data memory.

MCUs also include programmable peripherals such as analog-to-digital converters (ADCs), digital-to-analog converters (DACs), comparators, timers, serial communication interfaces (SCIs), universal asynchronous receiver/transmitters (UARTs), etc. In general, peripherals cooperate with the CPU to improve overall MCU performance. Operational aspects of peripherals are controlled according to control values that are generated by the CPU while executing the main program. Drivers can provide software interfaces that enable the CPU to write control values to respective control registers of the peripherals.

SUMMARY

Common microcontroller unit (MCU) self-identification information is disclosed. In one embodiment, a packaged MCU includes a central processing unit (CPU) and a non-volatile memory. This non-volatile memory stores information unique to the MCU and/or the package. The non-volatile memory also stores a common main program that, when executed by the CPU, accesses the information. The information enables the common main program to adapt itself to resources of the MCU and/or package that are identified in the information.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Figure 1:
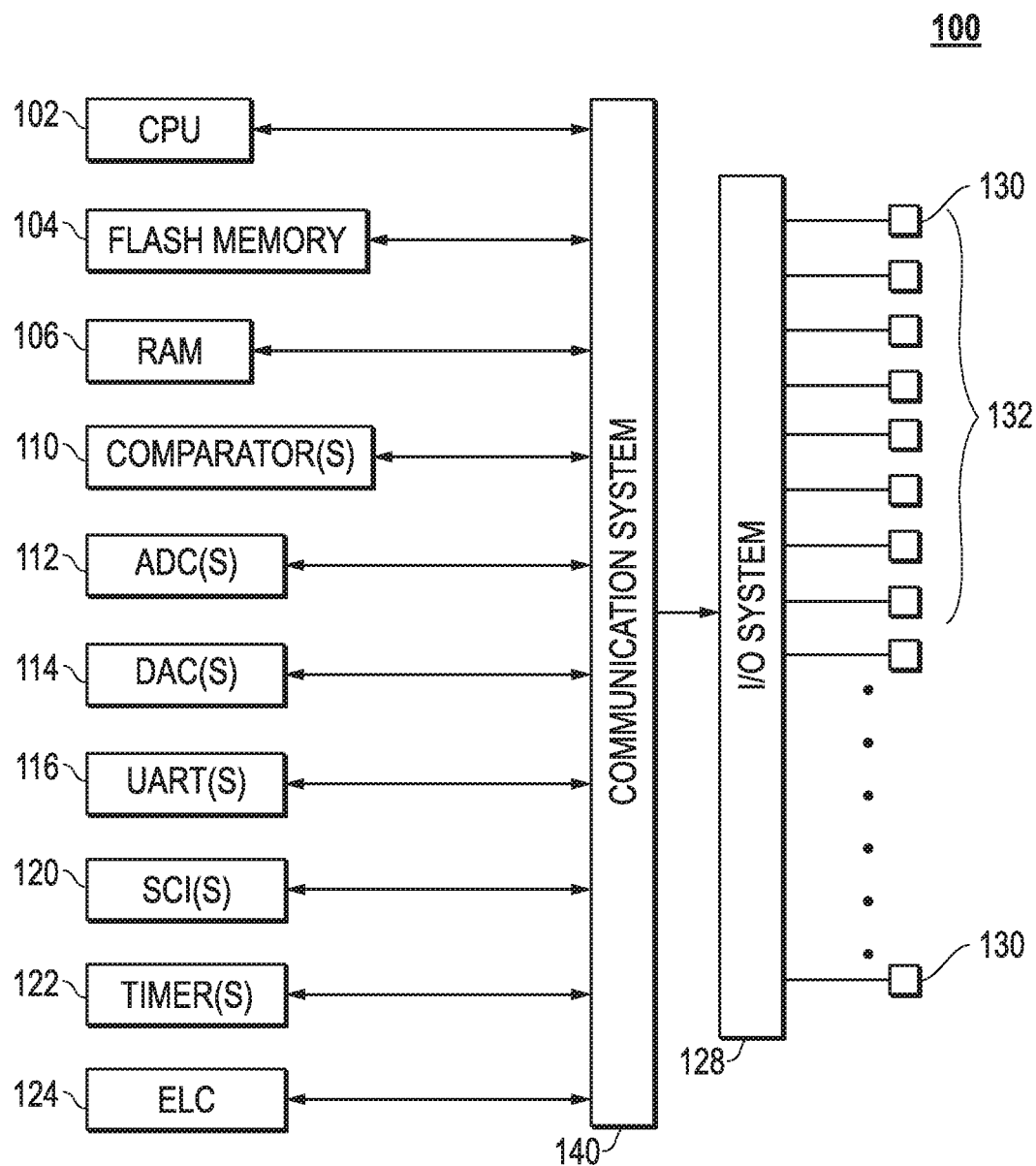
FIG. 1 is a block diagram illustrating an example MCU employing one embodiment of the present invention.

FIG. 1 is a block diagram, which illustrates several components of an example MCU 100. The present invention should not be limited to use with the MCU shown in FIG. 1. MCU 100 includes a CPU 102, flash memory 104, and RAM 106. CPU 102 uses RAM 106 for storing temporary data such as stack pointers. Flash memory 104 can store a reset program and a main program that is downloaded from a computer system via a communication link (not shown).

A fair amount of initialization and housekeeping must done before the CPU 102 runs the main program. Some very critical hardware may need to be initialized. Then some software initialization may need to happen, such as setting up a stack pointer and perhaps copying data from nonvolatile memory to volatile memory where it can be accessed and perhaps modified by CPU 102. Initialization and housekeeping is performed in accordance with the reset program embedded in flash memory. The CPU runs the reset program in response to activation of a reset signal. CPU 102 first sets a program counter to a value fetched from a predetermined reset vector location (such as 0x0000 hex) in flash memory 104. This fetched value is the address of the reset program. CPU 102 then runs the reset program. At the end of the reset process, the program is set to another predetermined value, which is a memory address where the main program can be found. CPU 102 then runs the main program.

MCU 100 includes several programmable peripherals that cooperate with CPU 102 while running the main program. Each of these peripherals include one or more registers for storing multibit values. CPU 102 can control operational aspects of peripherals by writing control values to control registers thereof. Or CPU 102 can read status values from status registers of the peripherals. CPU 102 can access these registers via respective software driver interfaces (drivers). Registers within peripheral are assigned unique addresses. The CPU or drivers must know the addresses for these registers in order to read or write values thereto. In one embodiment, each peripheral is assigned a respective base address, and addresses for registers of the peripheral are calculated as a function of the base address. In this embodiment, the drivers must know the base address for their respective peripherals in order to read or write values thereto.

Peripherals of MCU 102 include one or more comparators 110, each of which is programmable by CPU 102 to compare two input digitals values. CPU 102 and comparators 110 are built to interpret or process digital data, and accordingly they are not able to do anything with analog signals received from, for example, devices external to MCU 100. One or more analog-to-digital converters (ADCs) 112 can convert analog signals into a form that CPU 102 or digital comparators 110 can recognize. MCU 100 also includes one or more digital-to-analog converters (DACs) 114, which allow MCU 100 to output analog signals for controlling devices external to the MCU. One or more universal Asynchronous Receiver/Transmitters (UARTs) 116 and one or more Serial Communication Interfaces (SCIs) 120 enable MCU 100 to communicate with external devices such as computer systems, electronic testers, etc.

MCU 100 includes timers 122. Timers are circuits that include one or more functional units such as compare/capture units, pulse-width modulation (PWM) units, etc. Not all timers of an MCU are identical. Some timers of an MCU may include only compare/capture units, while other timers of the MCU include only PWM units. Still other timers of the MCU may contain both compare/capture units and PWM units and other functional units. Timers usually contain at least one n-bit counter register (hereinafter counter register), which stores an n-bit counter value (hereinafter counter value). Counter registers count pulses of a clock signal or pulses of an event signal.

MCU 100 includes an event link controller (ELC) 124. ELC 124 receives internally generated, binary event signals IE1-IEM from peripherals such as comparators 110, ADCs 112, timers 122, etc., via a communication system. ELC 124 can be configured by CPU 102 to select a subset E1-EN of the internally generated event signals IE1-IEM for distribution to one or more peripherals (e.g., timers 122) via the communication system.

I/O system 128 contains I/O pads 130, which can be arranged as ports such as port 132. I/O pads 130 can be configured by CPU 102 to an input state, an output state, or an unused state via control values stored in control registers. When I/O pads are in the input state, they are often used to read binary signals generated by devices external to the MCU 100. The binary signals can be stored in port registers of I/O system 128 until needed by CPU 102. When in the output state, devices external to the MCU 100 can be driven via I/O pads 130 in accordance with respective binary signals written to port registers by CPU 102. An I/O pad can be configured to the unused state in which, for example, the I/O pad is continuously connected to ground in order to avoid electromagnetic interference problems. CPU 102 should set I/O pads 130 that are not connected to package pins to the unused state.

Components 102-130 are in data communication with each other via a communication system 140. Although not shown, the communication system may 132 take form in one or more buses, signal lines and other devices that are configured to transmit control values, status values, event signals, addresses, instructions, etc. In one embodiment, communication system 132 contains one set of address and data buses to access program instructions of flash memory 102, and another set of address and data buses to access RAM 104, registers of peripherals 110-124, or registers of I/O system 128.

MCU manufacturing is a multiple-step sequence in which multiple dies of MCUs are gradually created on a wafer made of pure semiconducting material. Once created, the MCU dies (hereinafter MCUs) are subjected to a variety of electrical tests to determine if they function properly. The wafer is scored and then broken into individual MCUs, a process known as wafer dicing. Product numbers may be stored in non-volatile memories of MCUs before they are diced.

Only those MCUs that pass wafer testing are assembled into packages that prevent physical damage and corrosion. There are many ways of packaging MCUs. For the purposes of explanation only, the present invention will be described with respect to a method of packaging that includes mounting the MCU on a lead frame, connecting input/output (I/O) die pads of the MCU to respective I/O conductors (e.g., pins) of the lead frame using tiny wires, and sealing the MCU with a plastic material. Some die pads might not be connected to pins during packaging. The MCUs are tested again after packaging, as the wires may be missing, performance may be altered by the package, etc. This is referred to as the "final test." A laser etches identifying information (e.g., name and product number) on the package.

Figure 2:
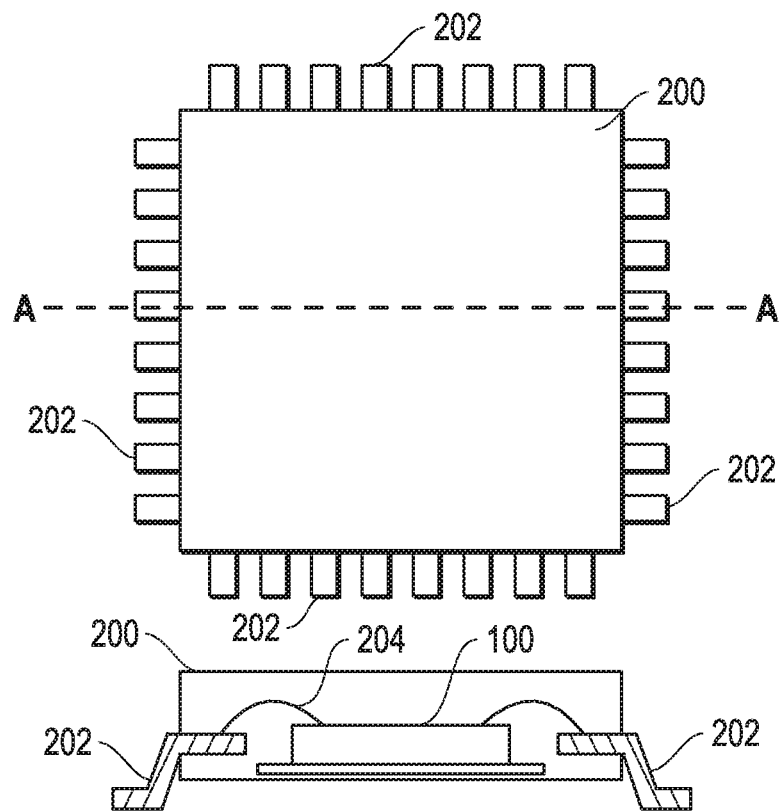
FIG. 2 is a block diagram illustrating a package containing the MCU of FIG. 1.

FIG. 2 illustrates top and cross sectional views of an example package 200 containing MCU 100. With continuing reference to FIG. 1, package 200 includes I/O conductors or pins 202 connected to respective I/O pads 130 via tiny wires 204. Some I/O pads 130 may or may not be connected to a pin 202. Those I/O pads 130 that are not coupled to package pins 202 should be set to the unused state by CPU 102 during runtime.

The packaged MCU of FIG. 2 is an example of one member in a family of packaged MCUs provided for sale by a manufacturer such as Renesas Electronics America, Inc. The manufacturer identifies each member in the family it sells by a unique SKU or product number. Real or marketed differences exist between members in a family of packaged MCUs. For example the package of one member may have 40 I/O pins, while a package of another member may have 48 I/O pins. The MCU in one family member may have 128 k of RAM (i.e., RAM 106), and 6 SCIs 120, while the MCU in another member may have a 56 k RAM 106, and 2 SCIs 120. The MCU in one member may include a UART 116, while the MCU in another member may not include a UART 116. Some members in the family have different product numbers, but contain identical MCUs. These members are marketed as having different resources or features. For example one member is marketed as having 128 k RAM 104, 4 SCIs 120, and 2 ports, while another member is marketed as having 256 k RAM 104, 6 SCIs, and 3 ports, even though the MCUs in both members are identical in structure. Ultimately, depending upon the actual or marketed resources of the MCU and package, the number of different members in a family can be very large.

Customers often purchase several different members of a family of packaged MCUs for use in their end products. Customers can develop a different main program for each member they purchase, which is customized to the resources (e.g., size of flash memory 104, version and number of SCIs 120, etc.) the member is marketed to include. Creating customized main programs may require substantial time and expense. However, the time and expense can be largely avoided if the customer develops a common main program or a main program that can run on distinct members of a family. Once written the common main program can be compiled with a file that contains information that is general to many or all members of the family. Information from this general definition file can be intermixed into the common main program during compilation. For example, information can be intermixed that defines general aspects of an SCI peripheral. This information is needed by the common main program at runtime to invoke an SCI peripheral.

To run properly, however, the common main program may require additional information that is specific to the family member on which the program is running. This information may include: the version number, base address, and quantity of peripherals for each unique set of peripherals; the size of the RAM; the size of the flash memory; information needed for flash segmentation; the identity of package pins that are or are not connected to die pads, etc. The specific information enables the common main program, including common drivers, to adapt to the unique resources said to be included in the packaged MCU on which the program is running. For example, the base addresses mentioned above enable the common drivers to write control values to registers of peripherals.

The manufacturer could provide family member specific information for respective members in a family of package MCUs. The contents of the specific information varies from member to member. Problems can arise if the customer erroneously employs the wrong family member specific information. This problem and others can be resolved by employing an expanded family member specific definition file that contains information, indexed by product number, to any one of several different members of the family. During runtime, the CPU may access a non-volatile memory location to read a product number. The CPU can use the product number to access the appropriate information in the expanded family member specific definition file that is needed by the common main program. This expanded family member specific definition file, however, can be large, which may present problems when stored in packaged MCUs having limited flash memory.

The present invention solves these problems and others by writing a data object to flash memory during or immediately after final test, but before the packaged MCU 100 is sent to the customer. The data object includes information specific to the MCU 100 and/or the package 200 in which the MCU is contained. The information in the data object will be referred to below as MCU self-identification information.

The MCU self-identification information is readable by CPU 102 during execution of a common main program. The MCU self-identification information enables the common main program, including drivers thereof, to adapt to and fully utilize most or all resources (e.g., timers, SCIs, ports, etc.) said to be included in the MCU. Importantly, the MCU self-identification information can be written to flash memory 104 by electronic test equipment (not shown) during final test of the MCU 100 (i.e., while it is contained in a package) and before it is shipped to a customer.

Figure 3:
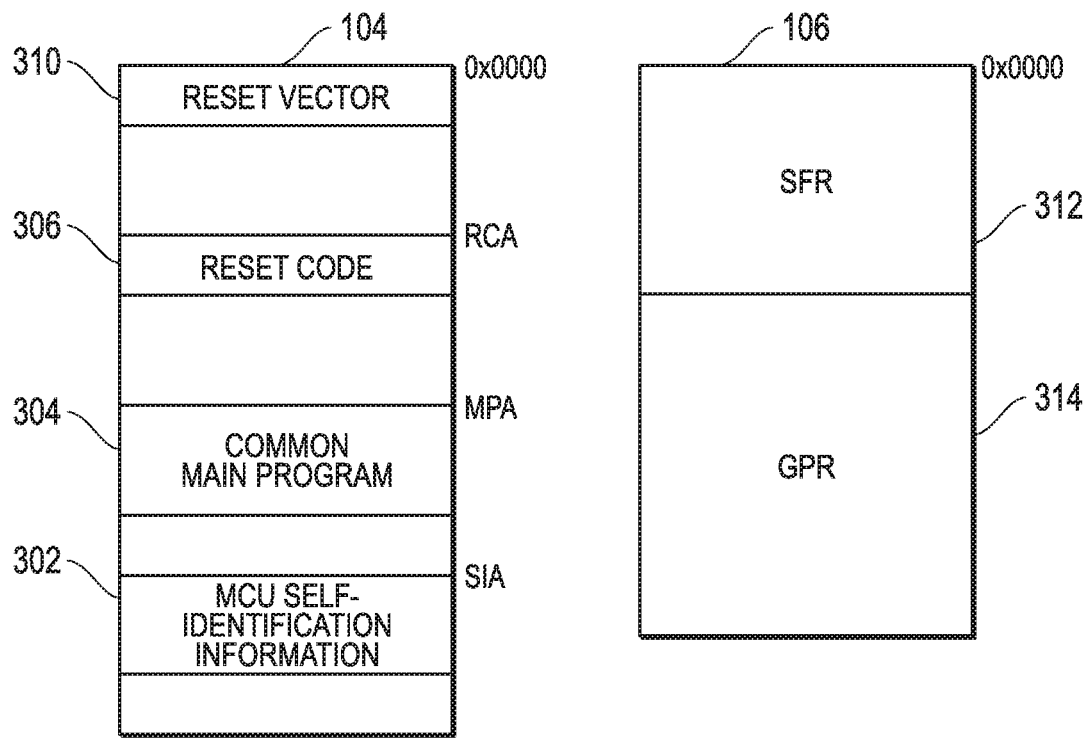
FIG. 3 is a graphical representation of flash memory and random access memory of the MCU of FIG. 1.

With continuing reference to FIG. 1, FIG. 3 graphically illustrates flash memory 104 that stores an example data object 302, which in turn includes example MCU self-identification information or information specific to MCU 100 and/or package 200. Flash memory 104 also includes a common main program 304, a reset program 306, and a reset vector 310. Data object 302 is stored in flash memory 104 at address SIA and is accessible by CPU when executing common main program 304. In one embodiment, the address location is the same for all members of a family of packaged MCUs. The information within data object 302 enables common main program 304 to adapt itself to the resources said to be included in MCU 100. Example contents of data object 302 are more fully described below.

FIG. 3 also shows RAM memory 106 that includes special function registers 312 and general purpose registers 314. Each of these registers is accessible by CPU 102 via a first set of data and address buses (not shown) of the communication system 140. Each of these registers is accessible or identified by a particular address within the data memory address space. Each of the peripherals 110-124 and I/O system 128 includes one or more registers that are accessible by CPU 102 via the first set of data and address buses and drivers when CPU 102 executes the common main program 304. CPU 102 can write control values to control registers in the peripherals 110-124 and I/O system 128 at addresses that are calculated as a function of base addresses in data object 302. Some of these control values may result in one or more I/O pads set to the unused state.

Figure 4:
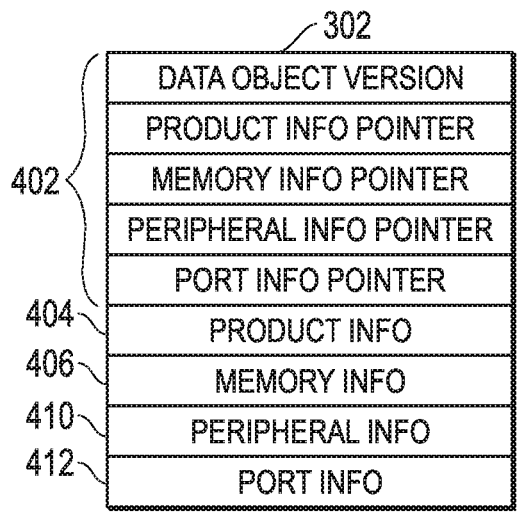
FIG. 4 is graphical representation of a data object stored in flash memory of FIG. 3.

FIG. 4 graphically illustrates one embodiment of data object 302. It should be noted that the structure and contents of the data object 302 should not be limited to that shown within FIG. 4, or subsequent figures. Data object includes a data object version number and pointers. The version number identifies the structure of data object 302. The pointers (i.e., addresses) point to sub data objects (e.g., records) 404-412 that store MCU self-identification information. Common main program 304 accesses records 404-412 via their respective pointers during run time to read information that is needed to adapt itself or its underlying drivers to the resources available on MCU 100. The contents of data object 302 vary from packaged MCU to packaged MCU. For example, one packaged MCU may include a UART 116, while another does not include a UART. The information contained within data object 302 should reflect the available resources of the MCU in which data object 302 is stored.

Figure 5:
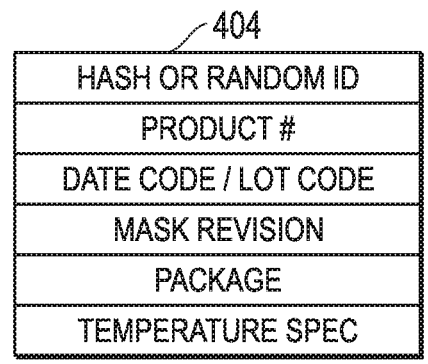
FIGS. 5-8 are graphical representations MCU self-identification information stored in the data object of FIG. 4.

As noted in FIG. 4, data object 302 includes a product info record 404. FIG. 5 illustrates in one embodiment of the product info record 404. In particular, product info record 404 includes a hash ID or random number that is unique to MCU 100. Record 404 includes the product number of the packaged MCU, the date code and lot code of the wafer from which MCU 100 was taken. The semiconductor manufacturer equipment that stores data object 302 in flash memory 104 may also etch the product number, date code, and lot code on an outer surface of package 200. Mask revision record includes a numeric value. The "Package" includes information about package 200 such as a part number for package 200, the number of pins 202, etc. Temperature specification contains information regarding operating characteristics such as the temperature range in which the MCU 100 is designed to operate, etc.

Figure 6:
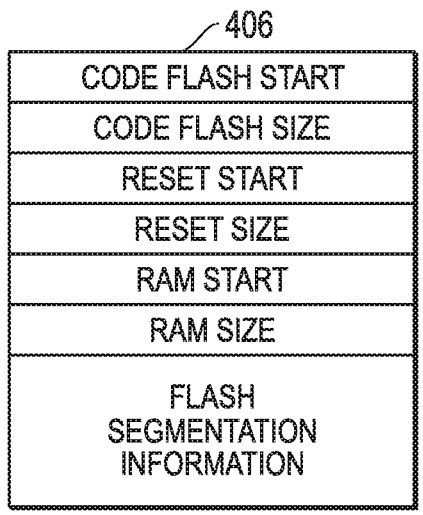

With continuing reference to FIG. 4, FIG. 6 illustrates one embodiment of the memory record 406 of data object 302. This record provides information about memory in MCU 100. In particular, memory record 406 includes information about flash memory 104 and RAM 106 including the start addresses and sizes. Additionally memory record 406 includes segmentation information needed to support flash memory erase/write. Record 406 may also include a start address of the reset program 306 and its size.

Figure 7:
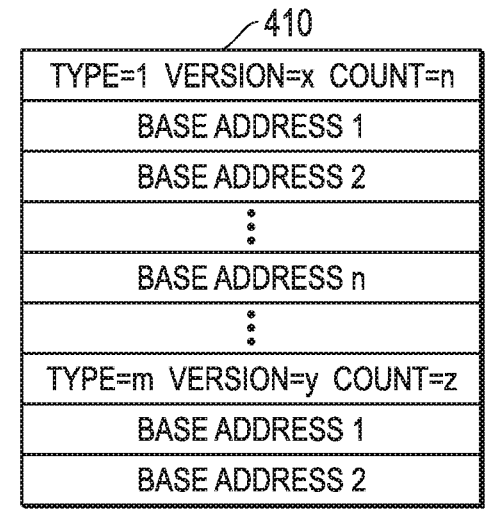

FIG. 7 illustrates an example of the contents shown within peripheral record 410 of FIG. 4. More particularly, record 410 identifies or provides information regarding peripherals contained within MCU 100. This information may include for each set of peripherals: type (e.g., timer, SIC, etc.); version number, and; the number of that type of peripheral on MCU 100. For each channel of the peripheral in a set, record 410 includes its base address within the data memory space. Peripheral record 406 tells drivers the base addresses of respective peripheral channels at run time, which can be used to access registers therein. With record 406 stored in flash memory 106, the base address location of peripheral channels are not needed at compile time. This allows customers to create more generic drivers that can be used with many different types and numbers of peripherals.

Figure 8:
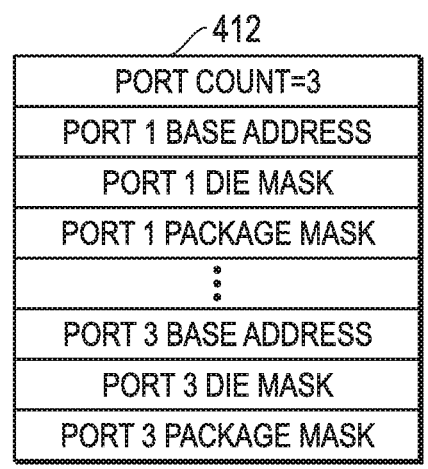

FIG. 8 illustrates example contents of the port information record 412 shown within FIG. 4. The port information record 412 identifies the number of ports available for use. For each port, the port information includes a base address for the port that can be used, for example, to access one or more registers associated with the port. Additionally, for each port, the port information record includes a die mask and a package mask. The die mask provides information about I/O die pads of the port while the package mask provides information about I/O pins of the port. Depending on the package 200, some I/O pads may not be bonded to I/O/pins. The die mask can show which I/O pads are in the port, while the package mask can show which I/O pins of the port are available in package 200. The CPU 102, executing a common main program, can use this information for several purposes such as to identify and set unused I/O pads 130 to the unused state.

As noted above, MCU 102, while executing the common main program 304, accesses data object 302 in order to adapt itself to the particular resources available on MCU 100, or the resources marketed by the manufacturer of MCU 100. For example, before a driver can write a control value to one of the timers, CPU 102 can access record 410 to find the base address for the timer. The driver (not shown) uses this base address in order to write, for example, a control value to the timer.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising
   packaging a microcontroller unit (MCU), wherein the MCU comprises a non-volatile memory, wherein the non-volatile memory is configured to store a common main program,
   after the packaging, storing information in the non-volatile memory separate and apart from the stored common main program;
   wherein the information comprises information specific to the MCU; and
   wherein the MCU comprises a central processing unit (CPU) configured to read the information in response to executing instructions of the common main program,
   wherein the common main program is stored in a range of contiguous addresses in the non-volatile memory, and wherein storing the information in the non-volatile memory comprises storing the information at a dedicated address that is separate from the range of contiguous addresses at which the common main program is stored.

2. The method of claim 1 wherein the packaging comprising an act of electrically connecting input/output (I/O) pads of the MCU to respective I/O conductors of the package, and wherein the information is transmitted to the MCU via one or more of the I/O conductors of the package.

3. The method of claim 1:
   wherein the MCU comprises a random access memory (RAM);
   wherein the information comprises a size of the RAM and a start address for the RAM;
   wherein the non-volatile memory comprises a flash memory;
   wherein the information comprises a size of the flash memory and a start address for the flash memory;
   wherein the CPU is configured to read and process the size of the RAM, the start address for the RAM, the size of the flash memory, or the start address for the flash memory in response to executing the instructions of the common main program.

4. The method of claim 1:
   wherein the MCU comprises a plurality peripherals;
   wherein the information comprises a plurality of addresses for the plurality of peripherals, respectively;
   wherein the information comprises a plurality of peripheral types;
   wherein the information comprises a plurality of peripheral version numbers;
   wherein the CPU is configured to read and process the plurality of addresses, the plurality of peripheral types, or the plurality of peripheral version numbers in response to executing the instructions of the common main program.

5. The method of claim 1:
   wherein the MCU comprises a plurality of the I/O pads arranged as an MCU port;
   wherein the information comprises an address for the MCU port;
   wherein the information comprises an identification of the I/O pads connected to respective I/O conductors of the package.

6. The method of claim 1 wherein the information enables the common main program, once the information is stored in the non-volatile memory, to adapt itself to resources of the MCU at runtime.

7. The method of claim 1 wherein the information identifies I/O pads of the MCU that should be set to an unused state during runtime.

8. An apparatus comprising:
   a microcontroller unit (MCU) contained in a package;
   wherein the MCU comprises a central processing unit (CPU) and a non-volatile memory;
   wherein the non-volatile memory stores information specific to the MCU and the package;
   wherein the non-volatile memory is configured to store a common main program separately and apart from the stored information that, when executed by the CPU, results in access of the stored information by the common main program.

9. The apparatus of claim 8:
   wherein the MCU comprises a random access memory (RAM);
   wherein the information comprises a size of the RAM and a start address for the RAM;
   wherein the non-volatile memory comprises a flash memory;
   wherein the information comprises a size of the flash memory and a start address for the flash memory;
   wherein the CPU is configured to read and process the size of the RAM, the start address for the RAM, the size of the flash memory, or the start address for the flash memory in response to executing the instructions of the common main program.

10. The apparatus of claim 9:
    wherein the MCU comprises a plurality peripherals;
    wherein the information comprises a plurality of addresses for the plurality of peripherals, respectively;
    wherein the CPU is configured to read and process the plurality of addresses in response to executing the instructions of the common main program.

11. The apparatus of claim 9:
    wherein the information comprises a plurality of peripheral types;
    wherein the information comprises a plurality of peripheral version numbers;
    wherein the CPU is configured to read and process the plurality of peripheral types, or the plurality of peripheral version numbers in response to executing the instructions of the common main program.

12. The apparatus of claim 9:
    wherein the MCU comprises a plurality of the I/O pads arranged as an MCU port;
    wherein the information comprises an address for the MCU port;

wherein the information comprises an identification of the I/O pads connected to respective I/O conductors of the package.

13. The apparatus of claim 12 wherein the information identifies I/O pads of the MCU that should be set to an unused state during runtime.

14. A method comprising:
a central processing unit (CPU) of a microcontroller unit (MCU) executing instructions of a common main program that is stored in non-volatile memory of the MCU;
the CPU reading information of a data object stored in the non-volatile memory in response to executing the instructions of the common main program;
wherein the data object is separate and apart from the main program;
wherein the data object comprises information specific to the MCU and a package into which the MCU is packaged.

15. The method of claim 14:
wherein the read information comprises a base address for a peripheral of the MCU;
wherein the method further comprises:
the CPU generating a control value for controlling the peripheral;
the CPU generating an address of a register in the peripheral as a function of the base address;
storing the control value in the register after generating the address.

16. The method of claim 14:
wherein the MCU comprises I/O pads;
wherein the MCU comprises drivers for selectively driving respective I/O pads to a low state, a high state, or an unused state;
wherein the package comprises I/O pins;
wherein a first plurality of the I/O pads are coupled to a plurality of the I/O pins, respectively;
wherein a second plurality of the I/O pads are not coupled to any of the I/O pins;
wherein the read information comprises information for identifying the second plurality of I/O pads;
wherein the method further comprises:
the CPU setting each of the second plurality of the I/O pads to an unused state in response to the CPU reading the information.

17. The method of claim 14:
wherein the MCU comprises a random access memory (RAM);
wherein the information comprises a size of the RAM and a start address for the RAM;
wherein the non-volatile memory comprises a flash memory;
wherein the information comprises a size of the flash memory and a start address for the flash memory;
wherein the method further comprises the CPU reading and processing the size of the RAM, the start address for the RAM, the size of the flash memory, or the start address for the flash memory in response to executing the instructions of the common main program.

18. The method of claim 14:
wherein the MCU comprises a plurality of the I/O pads arranged as an MCU port;
wherein the information comprises an address for the MCU port;
wherein the information comprises an identification of the I/O pads connected to respective I/O conductors of the package.

19. The method of claim 14 wherein the common main program is configured to be run on two MCUs having distinct resources.

* * * * *